Dec. 5, 1944.  E. J. PATTERSON  2,364,312
BEET TOPPER
Filed Jan. 2, 1943  3 Sheets-Sheet 1

INVENTOR
E. J. Patterson
BY
ATTORNEYS

Dec. 5, 1944.  E. J. PATTERSON  2,364,312
BEET TOPPER
Filed Jan. 2, 1943  3 Sheets-Sheet 2
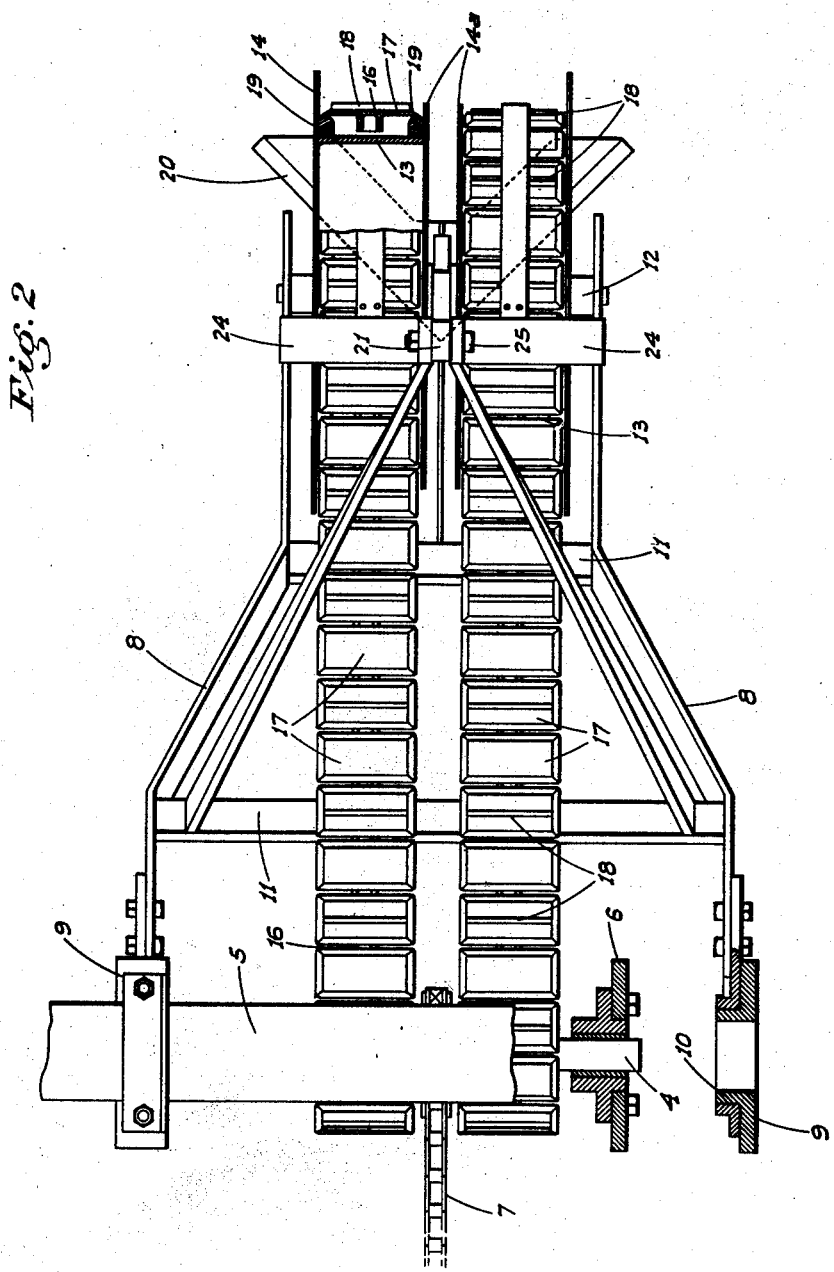
INVENTOR
E. J. Patterson
BY
ATTORNEYS

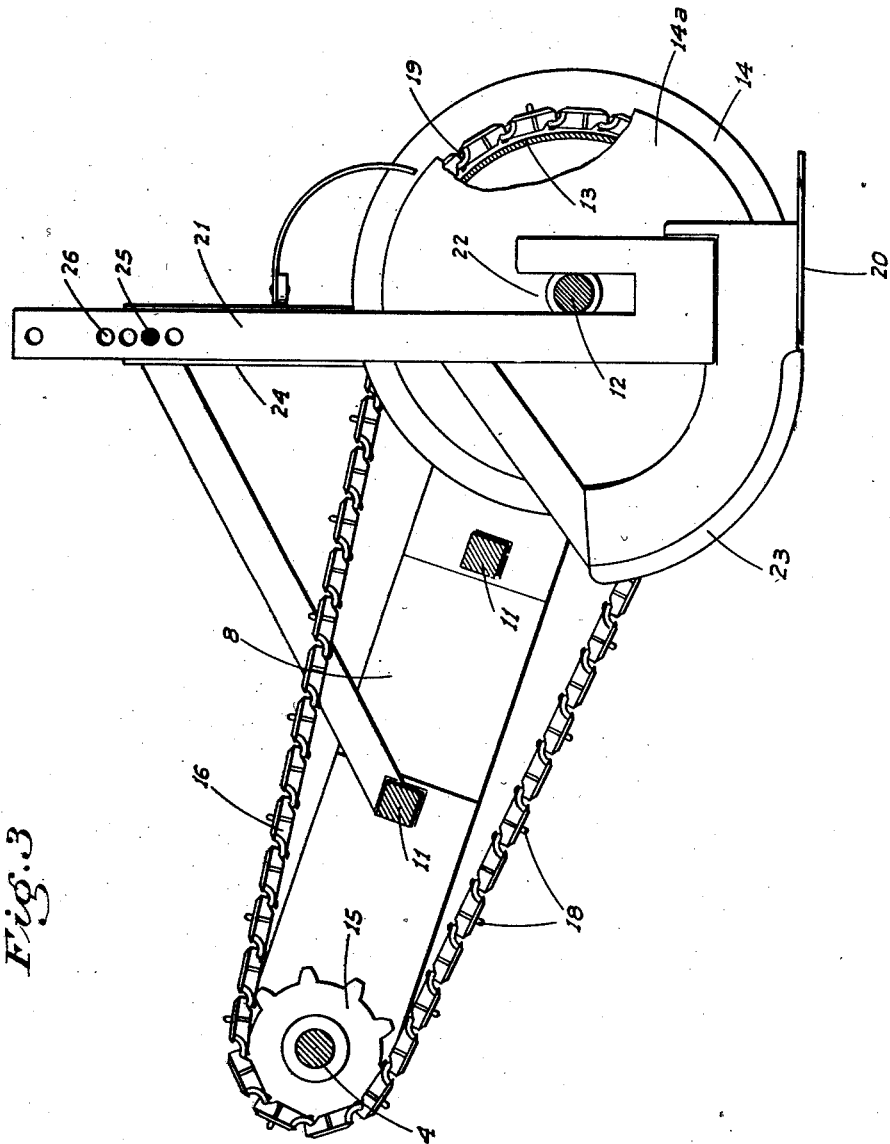

Patented Dec. 5, 1944

2,364,312

UNITED STATES PATENT OFFICE 2,364,312

BEET TOPPER

Edie J. Patterson, Stockton, Calif.

Application January 2 1943, Serial No. 471,095

6 Claims. (Cl. 55—107)

This invention relates to devices for topping beets while they are still in the ground; my principal object being to provide an apparatus for the purpose which will effectively top beets in a row at the same level from the top of the crown irrespective of the extent of projection of the beets from the ground.

The apparatus includes a topping knife which of course requires frequent resharpening; and another object of the invention is to provide a knife so mounted that it may be easily and quickly removed for resharpening and replacement whenever necessary without disturbing the other parts of the apparatus or having to dismantle the same.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a top plan view of a single-row unit of the apparatus, partly in section.

Figure 3 is a sectional elevation of a topping unit, detached.

Figure 1:
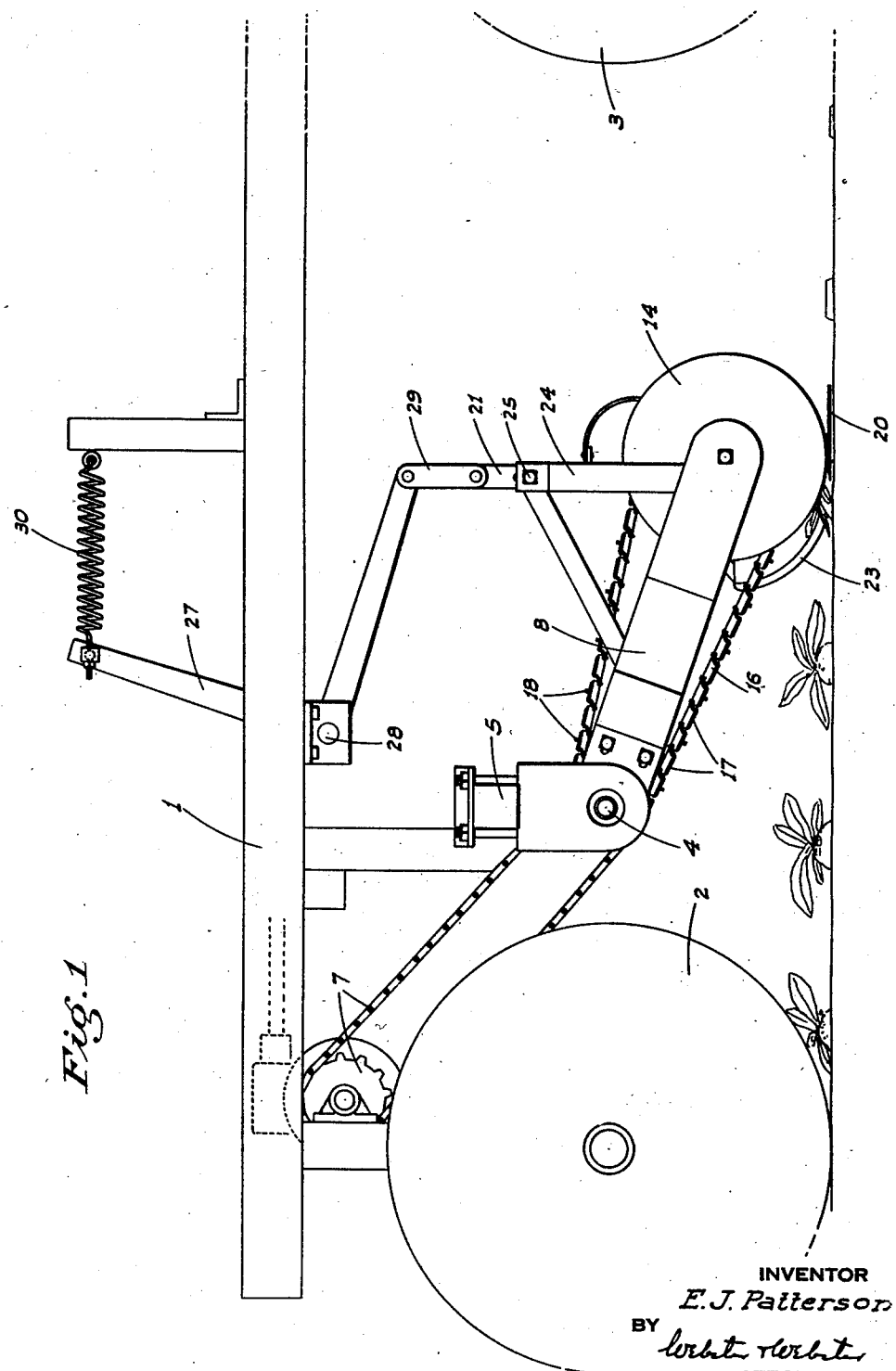
Figure 1 is a side elevation of my improved topping apparatus as mounted on a supporting machine.

Referring now more particularly to the characters of reference on the drawings, the beet topping apparatus is mounted on a self-propelled vehicle which includes a main horizontal frame structure 1 supported by front steerable wheels 2 and rear driven wheels 3 as is common practice; the type of vehicle in itself forming no part of my invention.

The topping apparatus is mounted between the front and rear wheels and includes a transverse shaft 4 below and supported from a cross beam 5 hung from the frame 1, the shaft being journaled in brackets 6 depending from said beam. This shaft is driven from the rear end power plant of the vehicle by any suitable means, including a chain 7 preferably projecting forwardly from the shaft 4.

For each row of beets the topping apparatus comprises longitudinally adjustable side arms 8 extending in rearwardly and downwardly projecting relation from the shaft, said arms being mounted for vertical swivel movement about the axis of the shaft by means of brackets 9 hung from the beam 5 and having annular flanges 10 concentric with the shaft and on which the arms adjacent their forward end are turnable. The arms are connected at spaced points in their length by cross bars 11.

The arms adjacent their rear ends support a rigid shaft 12 which extends therebetween and on which a pair of transversely spaced drums or wheels 13 turn. Each drum is fixed in rigid connection with and between thin or sharp-edged discs of greater diameter than the shaft. The outermost discs 14 project a considerable distance radially outwardly from the drum, while the inner or adjacent discs 14a are comparatively small in diameter.

Fixed on the shaft 4 are sprockets 15 which engage endless chains 16 of special form and individual links which include flat relatively wide plates 17, alternate ones of which are provided with cross cleats 18. These sprockets are disposed transversely so that the plates of the respective chains pass between the discs of the corresponding drums which are spaced to receive the plates in clearance relation. The plates, when passing about the drums, engage side beads 19 secured against the discs radially out from the drums so that the centrally disposed chains themselves properly clear said drums (see Fig. 2).

The radius of the discs 14a is approximately the same as that of the cross cleats 18 when the chains are wrapped about the drums.

The plates of both chains, while spaced transversely, are sufficiently close so that both sets of plates normally ride on the crown of each beet in a row in turn, and are of sufficient width so that one set of plates or the other will engage such beet irrespective of the exact alinement of the beets in the row. The lower run of the chains and their plates extend at a somewhat small acute angle to the ground, so that with the forward movement of the vehicle the plates gradually engage and ride on the different successively encountered beets, without any abrupt vertical movement of the apparatus taking place.

A flat horizontal forwardly pointed V-shaped topping knife 20 projects rearwardly from a point adjacent but ahead of the center of the drums and between the discs to a rearward termination laterally out from said drums, as shown in Fig. 2; said knife being of course disposed below the drums.

The knife is supported and is rigidly mounted on a standard 21 which is of a width to fit between the drums, and of a height sufficient to project some distance thereabove. The standard is disposed just ahead of the shaft 12 and is formed with a vertical upwardly open slot 22 which receives the shaft therein with a running fit, as shown in Fig. 3. A vertically disposed splitting blade 23, having a concave edge, is mounted rigid with the standard and blade 20, and projects in front of the same in alinement with the point of the blade 20, which is of course located centrally between the drums.

The standard above the drums passes closely between the upper portions of a pair of upstanding bars 24 rigid with and projecting upwardly from the side arms 8. A removable bolt 25 passes through said bars and any one of a vertical row of holes 26 in the standard. It will thus be seen that said standard and the knife thereon are supported against movement relative to the drums at vertically spaced points by the bolt 25 and the shaft 12. At the same time the removal of one bolt enables the standard to be easily removed by lowering or swiveling the same relative to the drums and shaft 12 until the slot 22 clears the shaft. Also without entirely withdrawing the standard the row of bolt holes 26 enables the level of the knife relative to the gauge plates 17 of the chains to be altered, so as to accordingly alter the amount or height of the crown portion of the beets which will be cut off.

The topping unit above described is free to swing about the driven shaft 4 as an axis, and its weight tends to cause it to conform to any difference in the level of the beets relative to the ground as said beets are engaged by the chain plates.

An additional positive downward pressure may be exerted against the unit, if necessary, by suitable spring-urged means, here shown as being a bellcrank lever 27, mounted on a transverse shaft 28 supported from the frame 1 above the topping unit. The lower longitudinally extending leg of the bellcrank is connected to the upper end of the standard 24 by a link 29, while the upper leg has an adjustable tension spring 30 applied thereto. A yieldable downward pressure is thus exerted on the standard which, by reason of the connecting bolt 25, is imparted to the topping unit as a whole. A more sensitive response of the unit, if necessary to the possible differences in level of successive beets, may thus be obtained than would otherwise be had, while enabling the unit itself to be made of relatively light-weight construction.

The mounting of the unit for swivel movement about the axis of the drive shaft 4, and independently thereof, enables such swiveling action to take place without affecting the driving of the chains 16, which travel at a speed somewhat greater than the ground speed of the machine, and whose lower runs move rearwardly. The vertical blade 23 engaging the beets ahead of the topping knife tend to prevent possible slipping of the knife laterally relative to the beets, and assures proper cutting of the top. The thin discs 14 then cut through any overhanging leaves in their path, while the inner discs 14a serve as guides for the chain plates.

While I have here shown and described a topping unit for a single row of beets only, it will be readily seen that by reason of the mounting of such unit in connection with main drive shaft 4, that other units may also be mounted alongside each other for independent swivel movement, and whose gauge chains would be driven from the single shaft 4 without any interference.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as set forth herein.

Having thus described my invention, what I claim as new and useful and desire to secure by Letters Patent is:

1. In a beet topping machine movable along the ground, a pair of transversely spaced rotary members adapted to ride on top of a beet, a shaft on which the members are mounted, a standard projecting between the members and having a topping knife fixed on its lower end, the standard having means forming a vertical shaft-receiving slot open on one end whereby the standard adjacent the shaft is held against relative horizontal movement, and means including a bolt removably mounting the standard in a fixed position relative to the members and preventing longitudinal movement of the standard.

2. In a beet topping machine movable along the ground, a pair of transversely spaced rotary members adapted to ride on top of a beet, a shaft on which the members are mounted, a standard projecting between the members and having a topping knife fixed on its lower end, the standard having means forming a vertical shaft-receiving slot whereby the standard adjacent the shaft is held against relative horizontal movement, while allowing of vertical adjustment of the standard relative to the members and means adjustably holding the standard in a normally fixed position relative to the members.

3. In a beet topping machine movable along the ground, a pair of transversely spaced rotary members adapted to ride on top of a beet, a shaft on which the members are mounted, a standard projecting between the members and having a topping knife fixed on its lower end, the standard having means forming a vertical shaft-receiving slot whereby the standard adjacent the shaft is held against relative horizontal movement; supporting arms mounted on the machine between which the members are disposed and in which the shaft is mounted, bars rigid with the arms and engaging opposite sides of the standard above the members, and a removable bolt extending through the bars and standard.

4. A structure as in claim 3, in which the slot is open at its upper end to enable the standard to be removed when the bolt is withdrawn.

5. In a beet topping machine movable along the ground, a pair of transversely spaced rotary members adapted to ride on top of a beet, forwardly projecting arms between which the members are journaled, a transverse drive shaft mounted on the machine and about which the arms at their forward end are turnable, endless units passing about the members and shaft and driven by the latter; the lower run of the unit being disposed at a relatively small acute angle to the ground and said unit including beet-engaging elements; the members including sharp edged discs projecting radially out beyond the elements from the opposed ends of the members.

6. In a beet topping machine movable along the ground, a rotary drum adapted to ride on top of a beet, a forwardly projecting arm supporting the drum, a drive sprocket mounted on the machine and about the axis of which the arm at its forward end is turnable, an endless chain passing about the sprocket and drum, the lower run of the chain being disposed at a relatively small acute angle to the ground, relatively wide beet engaging plates mounted on the radially outer side of the chain, and endless circumferential plate engaging elements on the drum and supporting the plates passing about the drum adjacent their side edges.

EDIE J. PATTERSON.